(12) United States Patent
Opperman et al.

(10) Patent No.: US 8,220,850 B2
(45) Date of Patent: Jul. 17, 2012

(54) IMPACT-ABSORBING ELEMENT FOR A VEHICLE AND METHODS OF PRODUCING THE SAME

(75) Inventors: Johannes Petrus Maria Opperman, Bovenkarspel (NL); Petrus Van Der Velden, Rijen (NL); Cornelis Gerardus Van Koert, Grootebroek (NL)

(73) Assignee: Voestalpine Polynorm Plastics B.V., Roosendaal (NL)

( * ) Notice: Subject to any disclaimer, the term of this patent is extended or adjusted under 35 U.S.C. 154(b) by 273 days.

(21) Appl. No.: 12/293,969

(22) PCT Filed: Mar. 23, 2007

(86) PCT No.: PCT/NL2007/000084
§ 371 (c)(1),
(2), (4) Date: Nov. 26, 2008

(87) PCT Pub. No.: WO2007/108677
PCT Pub. Date: Sep. 27, 2007

(65) Prior Publication Data
US 2009/0091061 A1    Apr. 9, 2009

(30) Foreign Application Priority Data

Mar. 23, 2006 (NL) .................................... 1031435
Sep. 8, 2006 (NL) .................................... 1032470

(51) Int. Cl.
*B60R 19/03* (2006.01)
(52) U.S. Cl. ... 293/120; 293/132; 293/124; 296/187.03; 296/146.6; 428/102
(58) Field of Classification Search ............... 296/146.6; 188/377; 293/120, 121, 122; 428/102; 264/261; 29/897.2
See application file for complete search history.

(56) References Cited

U.S. PATENT DOCUMENTS

| | | | | |
|---|---|---|---|---|
| 4,428,447 A * | 1/1984 | Malen | ............ | 180/68.4 |
| 5,141,273 A * | 8/1992 | Freeman | ........... | 293/122 |
| 5,212,010 A * | 5/1993 | Curzio et al. | ........... | 442/187 |
| 5,290,079 A | 3/1994 | Syamal | | |
| 5,330,818 A * | 7/1994 | Langley | ............ | 428/102 |
| 6,443,512 B1 * | 9/2002 | Van Rees et al. | ........... | 293/132 |
| 7,516,711 B2 * | 4/2009 | Messner et al. | ........ | 112/475.01 |
| 2002/0136870 A1 * | 9/2002 | Adriaensen et al. | ........ | 428/198 |
| 2003/0184099 A1 * | 10/2003 | Van Damme et al. | ........ | 293/120 |
| 2004/0089390 A1 * | 5/2004 | Jallais et al. | .......... | 152/527 |
| 2005/0023847 A1 | 2/2005 | Van Damme | | |
| 2006/0013990 A1 * | 1/2006 | Brentrup et al. | ........... | 428/102 |
| 2006/0213174 A1 * | 9/2006 | Wu | ................ | 57/237 |
| 2007/0271793 A1 * | 11/2007 | Mellis et al. | ........... | 29/897.2 |

FOREIGN PATENT DOCUMENTS

| | | |
|---|---|---|
| EP | 1690966 | 2/2005 |
| WO | WO 2005/118263 | 12/2005 |

* cited by examiner

*Primary Examiner* — Glenn Dayoan
*Assistant Examiner* — Pinel Romain
(74) *Attorney, Agent, or Firm* — Knobbe Martens Olson & Bear LLP

(57) ABSTRACT

The invention relates to an impact-absorbing element for a vehicle, in particular a car, comprising: a body comprising a thermoplastic polymer material; an elongate reinforcing structure provided in the body and comprising a number of metal reinforcing cords extending substantially parallel and a number of positioning elements arranged between the cords for holding the metal reinforcing cords substantially mutually parallel before and during the manufacturing process. The positioning elements ensure that the cords remain correctly positioned before, during and after the manufacturing process despite the forces occurring in the manufacturing process.

36 Claims, 7 Drawing Sheets

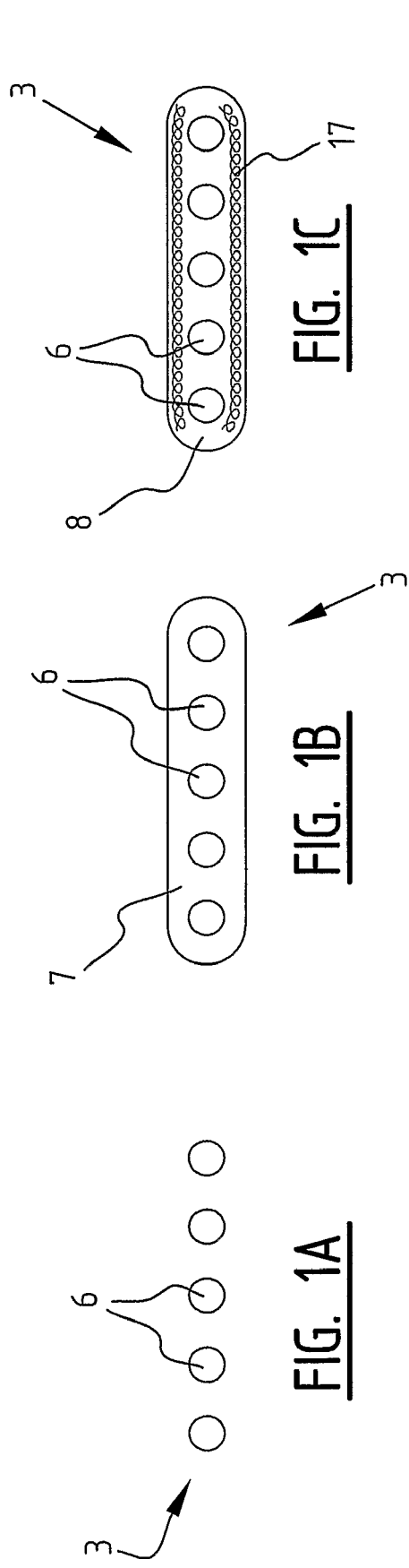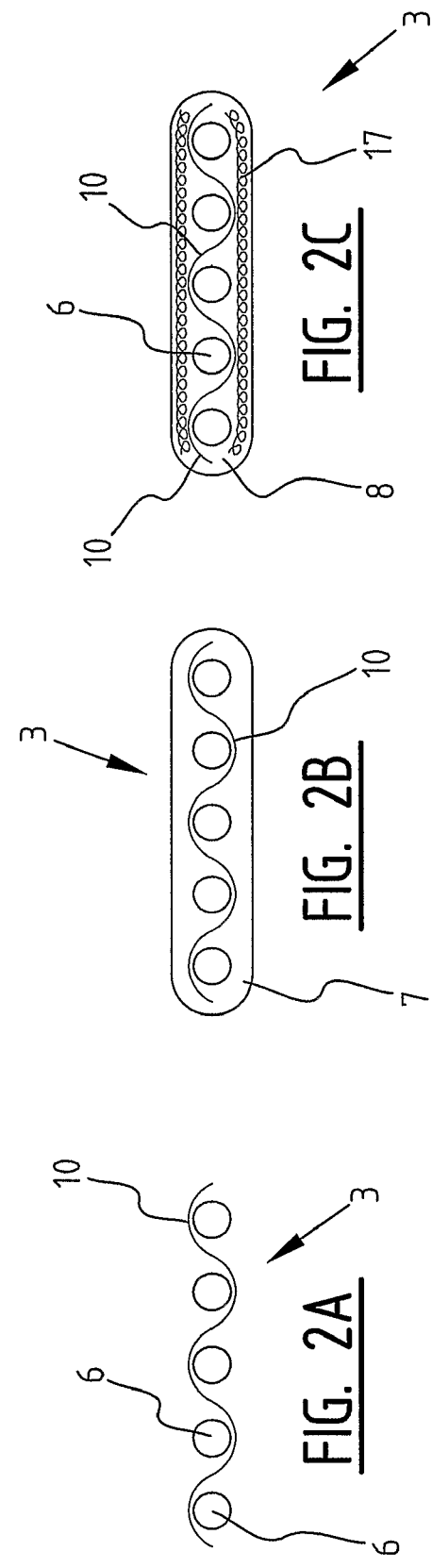

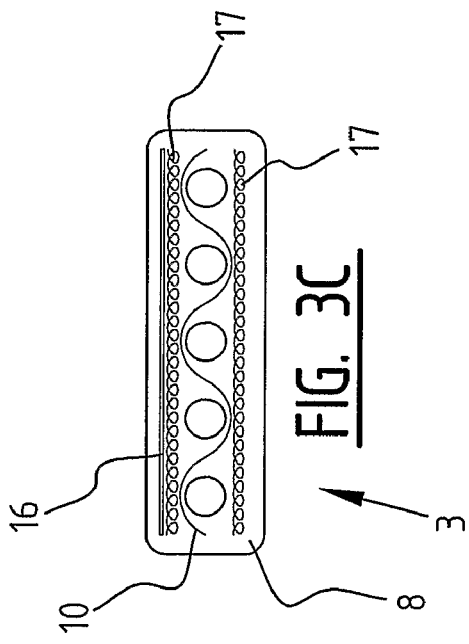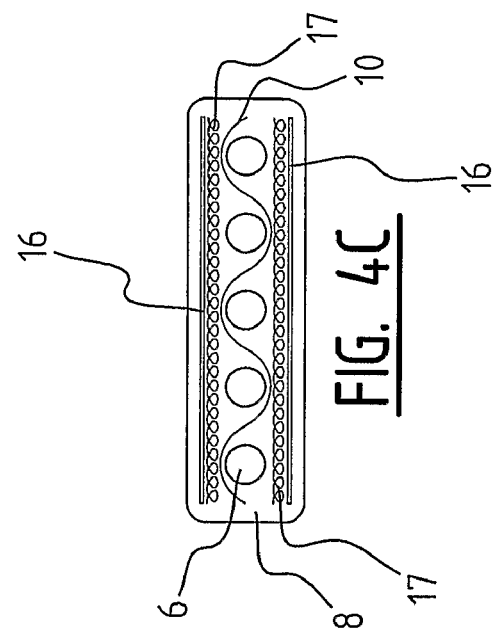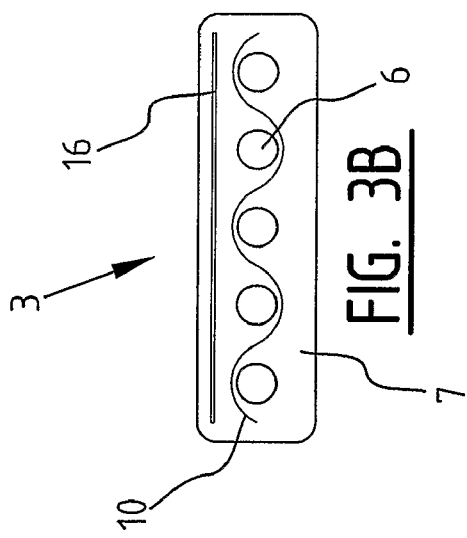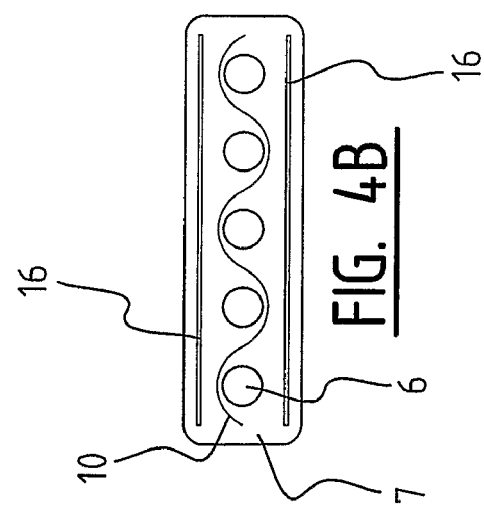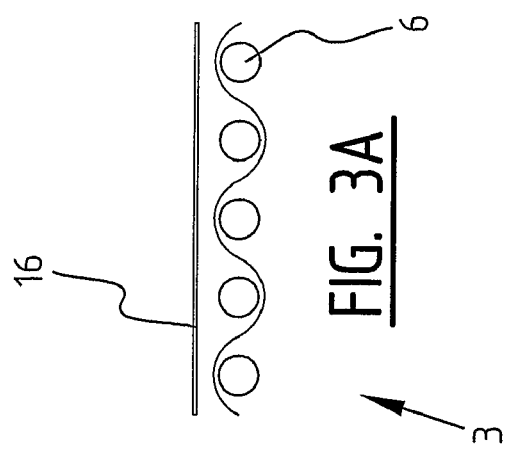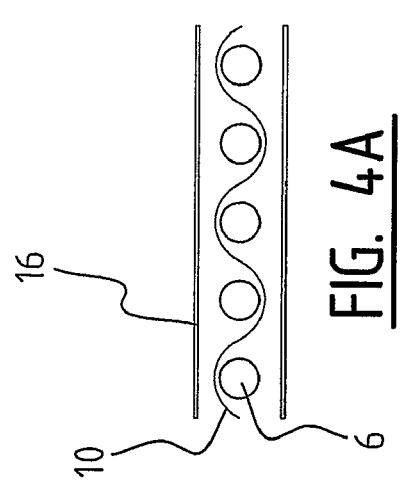

IMPACT-ABSORBING ELEMENT FOR A VEHICLE AND METHODS OF PRODUCING THE SAME

RELATED APPLICATIONS

This application is the U.S. National Phase under 35 U.S.C. §371 of International Application No. PCT/NL2007/000084, filed Mar. 23, 2007, designating the U.S. and published in English on Sep. 20, 2007 as WO 2007/108677, which claims priority under 35 U.S.C. §119(a)-(d) to Netherlands Patent Application No. NL1031435, filed Mar. 23, 2006 and Netherlands Patent Application No. NL1032470, filed Sep. 8, 2006. The content of these applications is incorporated herein by reference in their entireties.

The present invention relates to an impact-absorbing element for a vehicle, in particular a car. The invention also relates to a bumper and front-end module of a vehicle manufactured from such an element. The invention further relates to methods for manufacturing a reinforcing structure for such an impact-absorbing element and to methods for manufacturing an impact-absorbing element provided with one or more of such reinforcing structures.

In the car-manufacturing industry the development has occurred in recent years of more and more metal vehicle components being replaced by components manufactured wholly or partially from plastic. The use of plastic has several advantages. In many cases plastic components are relatively lightweight and inexpensive to manufacture. Parts of the vehicle susceptible to damage are therefore often manufactured from plastic components, which can be replaced quickly and easily after a collision.

Vehicle bumpers are for instance known consisting of a polymer matrix which is reinforced with glass fibres or other polymer fibres. These known bumpers have the drawback however that they tend to break various parts at the position where the impact occurs as a result of a collision, wherein the parts are catapulted in all directions. This can cause a hazard for the persons and objects in the vicinity of the vehicle. The market for vehicle bumpers reinforced only with glass fibre is moreover expected to disappear in the long term due to the ever-increasing test speeds.

Also known are vehicle bumpers which are constructed from a plastic body in which a reinforcing strip or elongate reinforcing structure is arranged. The reinforcing structure comprises, among other parts, a number of parallel steel cords. The cords are herein embedded in plastic, which may or may not be the same as the above stated plastic. Such a bumper is for instance described in international patent application WO 03/076234 A1 of applicant. Such a bumper has an improved resistance to impact resulting from a collision and has an improved integrity during and after the impact. The known bumper does however have a number of drawbacks.

A first drawback is that, when the bumper is manufactured by means of a compression moulding technique, the reinforcing cords can displace during moulding in the moulding tool, so there is a great chance that the reinforcing cords in the bumper are no longer situated at the desired position in the end product. This can result in the bumper providing an insufficient impact resistance. This lack of reproducibility in the manufacturing process is undesirable.

When on the other hand use is made of an injection moulding technique to manufacture the bumper, problems of a different nature can occur. It has for instance been found that it is difficult to anchor the reinforcing structure firmly in the surrounding plastic body.

It is an object of the invention to provide an improved impact-absorbing element wherein at least one of the above stated prior art drawbacks is obviated.

It is also an object of the invention to provide a method for manufacturing a reinforcing structure.

It is a further object of the invention to provide a method for manufacturing an impact-absorbing element provided with such a reinforcing structure.

According to a first aspect of the present invention, there is provided for this purpose an impact-absorbing element for a vehicle, in particular a car, wherein the element comprises:

a body comprising a thermoplastic polymer material;
an elongate reinforcing structure provided in the body and comprising a number of metal reinforcing cords extending substantially parallel and a number of positioning elements arranged between the cords for holding the metal reinforcing cords substantially mutually parallel before and during the manufacturing process. The positioning elements, formed in an advantageous embodiment by weft threads and formed in an even more advantageous embodiment by temperature-resistant weft threads, ensure that the reinforcing cords remain positioned in the correct manner before, during and after the manufacturing process despite the (transverse) forces occurring in the manufacturing process. The manufacture of the elements has hereby become a readily reproducible process, even when a compression moulding technique is used. Such an element further has improved impact-absorbing properties compared to elements in which the reinforcing cords lack such positioning elements.

According to a first preferred embodiment, the reinforcing structure also comprises a matrix provided round the reinforcing cords and positioning elements, which matrix comprises thermoplastic polymer material. Once embedded in such a matrix, the reinforcing structure can be incorporated in simple manner in an impact-absorbing element.

According to a further preferred embodiment, the matrix of the reinforcing structure also comprises one or more random fibre structures, for instance a random structure of glass fibres, for the purpose of anchoring the metal cords. It has been found that such random fibre structures can bring about an improved positioning of the cords, particularly in those situations where the impact-absorbing element is manufactured via a compression moulding process. The random fibre structure can herein be provided on a side of the surface defined by the metal cords and positioning elements, although random fibre structures on either side of said surface are recommended in most cases.

When reference is made to a random fibre structure, in a further preferred embodiment this is understood to mean a layer or strip constructed from mutually hooking fibres, for instance basalt fibres or, preferably, glass fibres. When the reinforcing cords are for instance constructed from two or more mutually entwined metal strands and when the glass fibres have dimensions such that they reinforce the matrix sufficiently, this provides a certain degree of mechanical anchoring of the random fibre structure to the cords.

The fibre length of such a random fibre structure preferably amounts to between 1 cm and 10 cm. It has been found that the random fibre structure(s) has (have) a thickness of a maximum of about 2 mm, preferably a maximum of about 1 mm. These values apply to the fibre structure in the situation of use. The thickness of the fibre structure in the original state, before it is arranged in the product, amounts to a maximum of about 2 cm, preferably a maximum of about 1 cm.

In a further preferred embodiment the matrix also comprises at least one glass fabric which is provided on a side of the surface defined by the metal cords and positioning elements, or, in another preferred embodiment, are provided on both sides of said surface. Such fabrics protect the cords against displacement during a compression moulding process.

The glass fabric is preferably a fabric of glass fibres and co-mingled plastic yarns, preferably polypropylene yarns. Such a fabric allows of relatively good impregnation by the polymer material of the reinforcing construction and/or of the body, which for instance improves the protection from the transverse forces which can occur during flow of the material in the case of a compression moulding manufacturing process.

In a further preferred embodiment the one or more random fibre structures are arranged between the metal reinforcing cords on one side and the above stated glass fabric on the other.

In yet another further preferred embodiment a polymer layer is provided on either side of the reinforcing cords with positioning elements, at least a random fibre structure on each of the polymer layers, at least one further polymer layer on each of the random fibre structures, and at least one glass fabric on each of the further polymer layers and at least one sealing polymer layer on each of the glass fabrics.

In yet another further preferred embodiment the reinforcing construction has a substantially symmetrical form in axial direction in order to prevent a so-called bimetal effect.

According to a further preferred embodiment, the cords are constructed from diverse metal filaments with a diameter of 0.5 mm or smaller, preferably 0.3 mm or smaller, which are wrapped around each other (are entwined), thus creating a structure in which the filaments lie substantially in cord direction. The filaments provide strength and rigidity and it is therefore recommended that they lie in the longitudinal direction, i.e. the load direction. Entwining of the filaments moreover creates a slightly rough surface which allows of better mechanical anchoring.

According to a further preferred embodiment, mounting means are provided on the element for mounting the element on the vehicle.

In a further preferred embodiment the thermoplastic polymer material of the body and/or the thermoplastic polymer material of the matrix is polymer material chosen from the group of thermoplastics such as for instance polypropylene, polyethylene, polyethylene terephthalate, polybutylene terephthalate, polyamide, polycarbonate or mixtures thereof.

With an element as defined above a bumper of a vehicle, in particular a car, can be manufactured with excellent impact-absorbing properties. The metal cords extend in the longitudinal direction of the bumper. The bumper is mounted on either side on the car with mounting provisions. The reinforcing structure ensures that in a collision the bumper absorbs the impact, with a greatly reduced chance of parts of the bumper shooting away and potentially causing a hazard for the surrounding area.

Another application relates to a front-end module of a vehicle. A front-end module is provided on the front side of the vehicle and is a vehicle component which is mounted on either side of the front end of the vehicle and in which the headlights, the radiator and/or one or more bumpers are for instance mounted. Such a front-end module can comprise one or more of the impact-absorbing elements, so that the module can (partially) absorb a collision but can nevertheless be given a lightweight form and be manufactured at relatively low cost.

According to a preferred embodiment of a front-end module, it comprises a body provided with two or more reinforcing structures as well as lower and upper mounting means for mounting the body on lower and upper mounting provisions on the vehicle, wherein the module is adapted so that, in the mounted state, a first reinforcing structure extends between two upper mounting means and at least one reinforcing structure extends obliquely from the first reinforcing structure to at least one lower mounting means.

According to a further aspect of the present invention, there is provided a method for manufacturing a reinforcing structure for a body of an impact-absorbing element for a vehicle, in particular a car, the method comprising the steps of:
  providing a number of metal reinforcing cords extending substantially parallel and a number of positioning elements arranged between the cords for holding the metal reinforcing cords substantially parallel to each other;
  arranging at least one of a matrix of polymer material, one or more random fibre structures and one or more glass fabrics around the reinforcing cords and positioning elements.

According to a further aspect of the present invention, there is provided the method for manufacturing an impact-absorbing element for a vehicle, the method comprising the steps of:
  providing a reinforcing structure comprising substantially parallel metal reinforcing cords provided with positioning elements for holding the reinforcing cords substantially parallel to each other;
  providing one or more layers comprising thermoplastic polymer material;
  placing a pre-heated stack of the reinforcing structure with the one or more polymer layers into a compression mould;
  compressing the whole of reinforcing structure and fluid polymer material for bringing thereof into the desired form;
  cooling the reinforcing structure with the polymer material applied therearound which has been brought into the desired form.

In this method use is made of a compression moulding technique. Said stack is herein heated to a temperature well above the melting point of the polymer material, and the stack is compressed to a pressure of about 200 bar.

According to a further aspect of the present invention, there is provided a method for manufacturing an impact-absorbing element, the method comprising the steps of:
  providing a reinforcing structure comprising substantially parallel metal reinforcing cords provided with positioning elements for holding the reinforcing cords substantially parallel to each other;
  arranging one or more fixing openings between the metal reinforcing cords in the reinforcing structure;
  placing the reinforcing structure provided with fixing openings into an injection mould;
  injection-moulding thermoplastic polymer material in the injection mould for the purpose of arranging a body of polymer material around the reinforcing structure, wherein the polymer material also enters the fixing openings in order to fix the reinforcing structure in the body. In a determined embodiment the openings do not extend through the whole of the reinforcing structure. In other embodiments however, the fixing openings form passages through the reinforcing structure.

In a further embodiment protruding parts are provided in the injection mould for positioning the reinforcing structure. Formed between the protruding parts is the connection between the two sides of the reinforcing structure which is provided with the above stated corresponding fixing openings enabling a fusion of the two material flows.

Protrusions are preferably provided in the injection mould for providing corresponding recesses in the body of the element. When block-like protrusions are for instance arranged in the injection mould, they provide block-like recesses in the body of the impact-absorbing element, which has a favourable effect on the weight of the element.

According to a further aspect of the present invention, there is provided a method for manufacturing a front-end module of a vehicle, in particular a car, the method comprising the steps of:
- manufacturing an elongate first reinforcing structure;
- manufacturing one or more elongate second reinforcing structures;
- placing the second reinforcing structures obliquely relative to the first reinforcing structure;
- forming a body of thermoplastic polymer material round the first and second reinforcing structures;
- providing upper mounting means for mounting of the first reinforcing structure on upper mounting provisions in the vehicle; and
- providing lower mounting means for mounting of the one or more second reinforcing structures on lower mounting provisions in the vehicle.

In the above stated methods the reinforcing structure is preferably constructed according to one of the preferred embodiments thereof defined herein.

Further advantages, features and details of the present invention will be elucidated on the basis of the description of several preferred embodiments thereof. Reference is made in the description to the accompanying figures, in which:

FIGS. 1A-1C show cross-sections of different embodiments of a reinforcing structure for an impact-absorbing element according to the prior art;

FIGS. 2A-2C show respective cross-sections of a first, second and third preferred embodiment of a reinforcing structure according to the invention;

FIGS. 3A-3C show respective cross-sections of a fourth, fifth and sixth preferred embodiment of the reinforcing structure according to the invention;

FIGS. 4A-4C show respective cross-sections of a seventh, eighth and ninth preferred embodiment of a reinforcing structure according to the invention;

Figure 5:
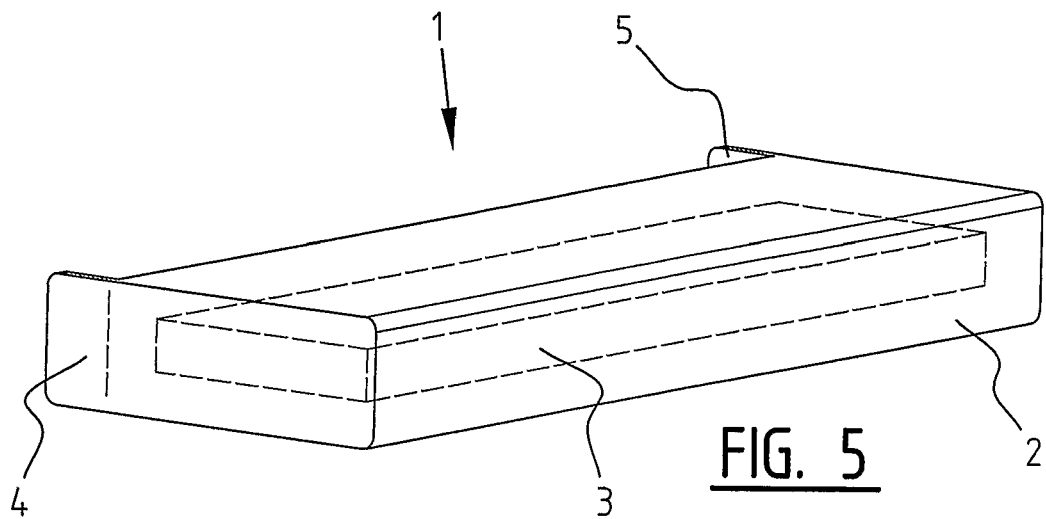
FIG. 5 shows a schematic perspective view of a bumper comprising a polymer body in which is arranged a reinforcing structure according to one of the preferred embodiments of the invention.

FIG. 5 shows a schematic view of an impact-absorbing element 1, in this case of bumper. The bumper is constructed from a plastic body 2 in which an elongate reinforcing structure 3 is arranged. Body 2 is constructed from a thermoplastic polymer material such as polypropylene. Reinforcing structure 3 is arranged to provide element 1 with the correct impact-absorbing and integrity-retaining properties. Shown schematically are left and right-hand mounting means 4, 5 with which the bumper can be mounted on a respective left and right-hand mounting provision of a car, usually provided on the front end of the vehicle chassis. In the shown embodiment reinforcing element 3 is coupled to mounting means 4, 5, but in other embodiments (not shown) this is not the case. In the above mentioned publication WO 03/076234 A1, the content of which should be deemed as incorporated herein, diverse forms of such vehicle bumpers reinforced with a reinforcing structure are described.

Reinforcing structure 3 can take different forms depending on the application and the associated requirements made of the impact-absorbing element and of the method of manufacturing the element. FIGS. 1-4 show diverse forms of reinforcing structures.

FIG. 1A shows a cross-section of a reinforcing structure 3 which is constructed solely from a number of parallel steel cords 6. It has been found that, if the reinforcing structure is embodied in this manner and the impact-absorbing element is manufactured using a compression moulding technique, the reinforcing cords can displace during the manufacturing process, whereby the desired pattern of cords is not preserved. When it is for instance the intention to distribute the cords uniformly over the structure, there is a great chance of the uniform distribution being lost during the moulding. This is disadvantageous for the quality of the element, and particularly the shock-absorbing properties thereof. It has therefore not been found feasible in practice to manufacture shock-absorbing elements with the desired properties in this manner. The same is the case for the embodiments of the reinforcing structure shown in FIGS. 1B and 1C. In the embodiment shown in FIG. 1B the metal reinforcing cords are arranged in a matrix 7 enclosing the cords 6, preferably a matrix of thermoplastic polymer material. In FIG. 1C matrix 8 comprises a glass fibre-reinforced thermoplastic polymer material. In these embodiments of the reinforcing structure it has also not been found possible, at least using a compression moulding technique, to manufacture an impact-absorbing element with the desired impact-absorbing properties.

When an alternative technique such as an injection moulding process is used to manufacture impact-resistant element 1, other problems can occur. In the case of injection-moulding, the adhesion between the plastic polymer material of body 2 and reinforcing structure 3 often leaves something to be desired, whereby it has been found difficult to manufacture impact-absorbing elements with the suitable properties.

FIGS. 2A-2C show respectively a first, second and third preferred embodiment of a reinforcing structure according to the invention.

FIG. 2A shows a first embodiment in which the substantially parallel reinforcing cords 6 of reinforcing structure 3 are mutually connected using a number of threads 10, also referred to as weft threads. Weft threads 10 extend obliquely or transversely of the longitudinal direction of cords 10 and have the primary function of holding together reinforcing cords 6.

Shown is that weft threads 10 are arranged in a kind of wave pattern around reinforcing cords 6, although this is only one of the many alternative methods of mutually coupling the cords using weft threads 10.

When an embodiment of reinforcing structure 3 as shown in any of FIGS. 2A-2C is used to manufacture an impact-absorbing element 1 using a compression moulding technique, a lesser degree of displacement of reinforcing cords 6 will take place when the element is moulded into the correct form. This is shown in more detail in FIG. 5.

Figure 6A:
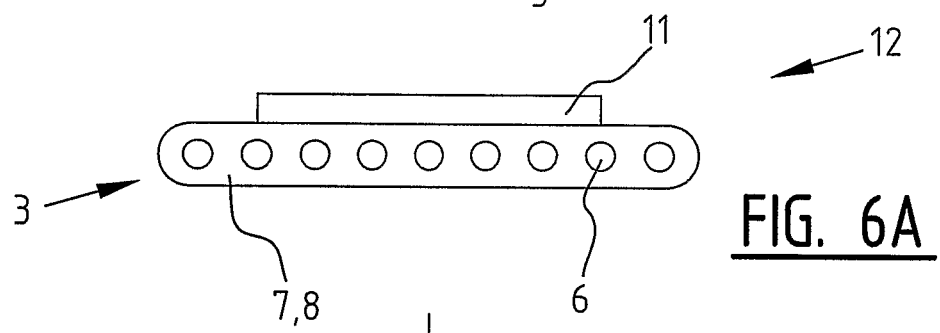
FIGS. 6A-6C show successive stages of a compression moulding method according to the invention.
Figure 6B:
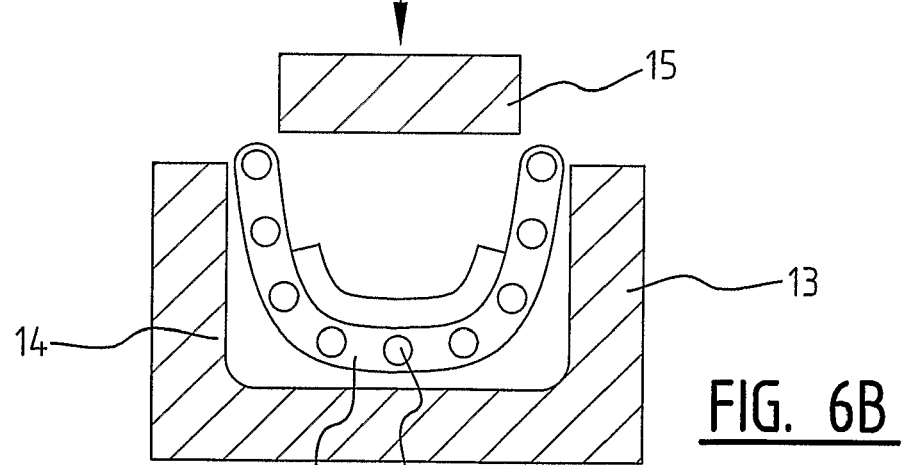
Figure 6C:
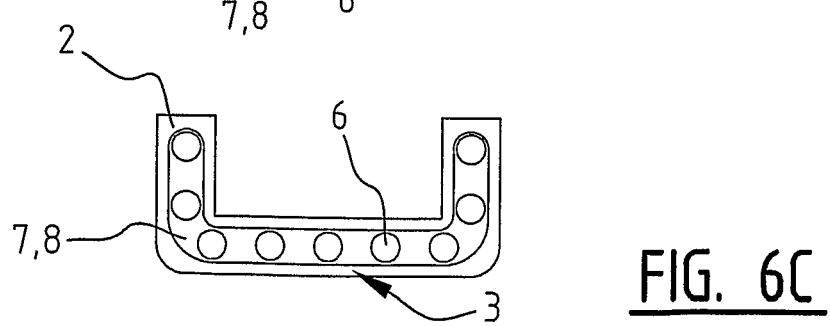

FIG. 6A shows a reinforcing structure 3 according to the preferred embodiment shown in FIG. 2B in which, as according to the second preferred embodiment, reinforcing cords 6 coupled to weft threads 10 (not shown in FIGS. 6A-6C for the sake of simplicity) are arranged. A layer 11, for instance a foil, of thermoplastic polymer material is placed on top of reinforcing structure 3. The stack 12 of foil 11 and reinforcing structure 3 is placed in a moulding tool 13 (FIG. 6B), the interior 14 of which has the desired form for the impact-absorbing element, such as a bumper or the like. Using a mould element 15 stack 12 is pressed into mould 13. Stack 12 is heated, for instance by heating moulding tool 13, so that the stack reaches a temperature of about 210 degrees Celsius. As a result of this increased temperature the thermoplastic layer 11 (and, in the embodiments shown in FIGS. 2B and 2C, thermoplastic material 7,8 of the reinforcing structure) becomes plastic and comes to lie around reinforcing cords 6. The whole is brought under pressure (at a pressure of characteristically about 200 bar) whereby a body 2 of the desired form results. When reinforcing cords 6 are not mutually connected, cords 6 will displace during the moulding process as a result of the moulding force of mould element 15, which can result in an undesirable distribution of the cords in element 1. When however reinforcing cords 6 remain aligned relative to each other in correct manner using weft threads 10, element 1 has after the compression moulding process a reinforcing structure 3 in which the reinforcing cords 6 are distributed in the desired manner, as shown in FIG. 6C.

It has been found in practice that in some cases weft threads 10 still provide too little protection against transverse displacement as a result of the moulding pressure when the thermoplastic material of the body and/or of reinforcing structure 3 itself begins to flow. In the embodiments shown in FIGS. 3A-3C and 4A-4C a glass fabric 16 is therefore added to the matrix of reinforcing structure 3. In the embodiments shown in FIGS. 3A-3C the glass fibre is arranged in matrix 7 on one side of reinforcing cords 6, while in the embodiments shown in FIGS. 4A-4C glass fabric 16 is arranged on both sides thereof in matrix 8. When glass fibre 16 is provided on one side in the manufacture of reinforcing structure 3, as is the case in the embodiments shown in FIGS. 3A-3C, the glass fibre is found to have a positive influence on the degree of displacement as a result of reinforcing structure 3 being pressed into the moulding tool.

Particularly good results are achieved when the glass fabric is constructed from a fabric of glass fibres and co-mingled plastic yarns, preferably yarns manufactured from polypropylene or similar plastic. Such a fabric can impregnate the thermoplastic polymer material of body 2 and/or of the rest of reinforcing structure 3 relatively well, wherein a good protection against displacement is provided.

The chance of undesired displacement of the reinforcing cords during the manufacturing process is further reduced if glass fabric 16 is arranged on both sides of the reinforcing cords, as in the embodiments shown in FIGS. 4A-4C.

It has been found that improved results can likewise be achieved when matrix 8 is provided with glass fibres, in particular in the form of one or more random fibre structures 17, as according to the third, sixth and ninth embodiments according to respectively FIGS. 2C, 3C and 4C. The best results can be obtained with the ninth embodiment shown in FIG. 4C, wherein not only is glass fabric 16 arranged on both sides of reinforcing cords 6, but wherein a random fibre structure 17 is also arranged between each of the glass fabrics 16 and the reinforcing cords 6.

The random fibre structure 17 consist of chopped glass fibres of a limited fibre length. Random fibre structure 17 is manufactured by cutting glass fibres to a predetermined fibre length in each case using a chopper and placing them on a conveyor belt. The glass fibres placed on the conveyor are guided into a so-called "nadelbak" whereby a mat (weight around 900 gr/m$^2$, other weights can however also be envisaged) of mutually hooking glass fibres is provided which has a thickness of a maximum of 2 cm, preferably 1 cm. The random fibre structure ensures an additional mechanical anchoring between reinforcing cords 6 and the rest of reinforcing structure 3. This is the result of the circumstance that individual glass fibres remain "hooked" behind the strands from which the reinforcing cords are constructed.

When the impact-absorbing element is manufactured with an injection moulding technique, displacement of the reinforcing cords is less of an issue since the pressures occurring during this manufacturing process are much lower. In the manufacture of an impact-absorbing element 1 a reinforcing structure 3 is arranged in known manner in an injection mould, wherein plastic material, preferably thermoplastic polymer material, is injected into the mould via inlet openings. The space between the inner wall of the mould and the reinforcing structure 3 is herein filled with plastic which wholly encloses reinforcing structure 3. A plastic body 2 provided with a desired reinforcing structure 3 is created after cooling of the whole. A problem occurring in this manufacturing process is however that reinforcing structure 3 is poorly anchored in the body arranged therearound. In order to nevertheless create a sufficient measure of anchoring between the body and the reinforcing structure, the technique illustrated in FIGS. 7 and 8 is applied.

Figure 7:
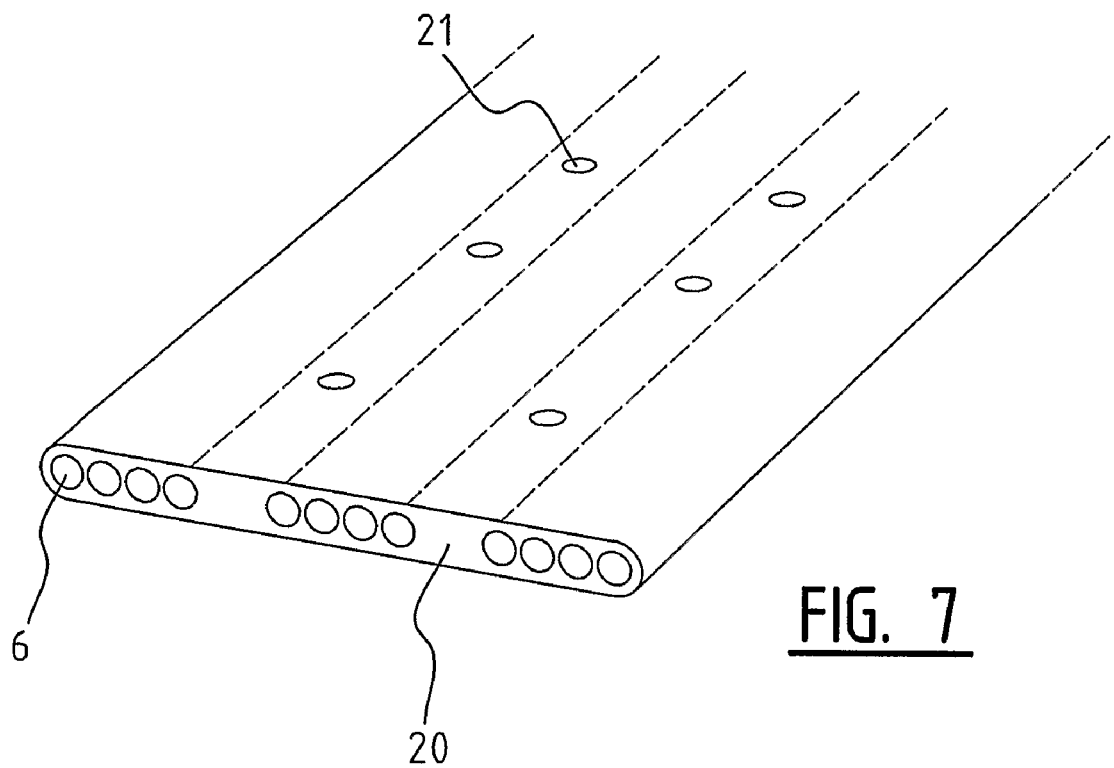
FIG. 7 shows a partially cut-away perspective view of a further embodiment of a reinforcing structure according to the invention.

FIG. 7 shows a reinforcing structure according to the per se known embodiment shown in FIG. 1B. The embodiments shown in FIG. 1C or in FIGS. 2-4 can however also be applied. A matrix 20 is shown in which reinforcing cords 6 are arranged in known manner. Reinforcing cords 6 are however arranged at intermediate distances such that space is created for openings 21 at some locations in reinforcing structure 3. Openings 21 provide a passage through the reinforcing structure, which passages can be utilized in the production process.

Figure 8:
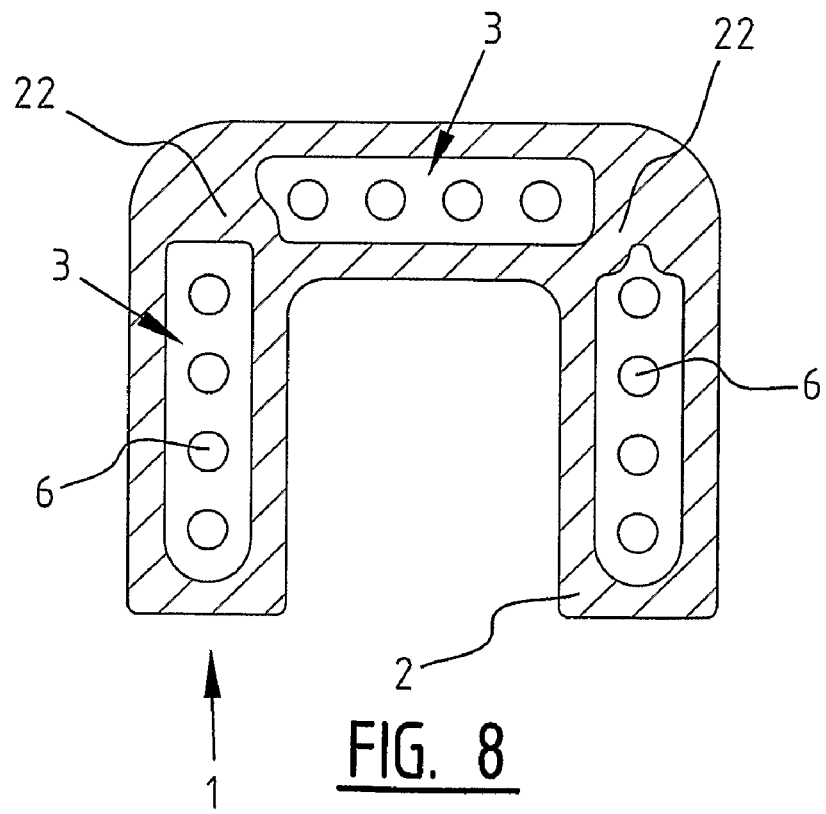
FIG. 8 shows a cross-section through an impact-absorbing element provided with the embodiment of FIG. 7.

FIG. 8 shows a schematic cross-section of an impact-absorbing element manufactured using an injection moulding process. Firstly, the reinforcing structure 20 shown in FIG. 8 is heated and a mould is arranged so that reinforcing structure 20 obtains a random form, for instance the form shown in FIG. 8. When the thus formed reinforcing structure 20 is placed in an injection mould (not shown) and thermoplastic material is injected, the thermoplastic material will not only enclose the reinforcing structure 3 but also form at the position of the passages connecting pieces 22 with which the reinforcing structure 20 is fixed inside body 2 of element 1.

Figure 9:
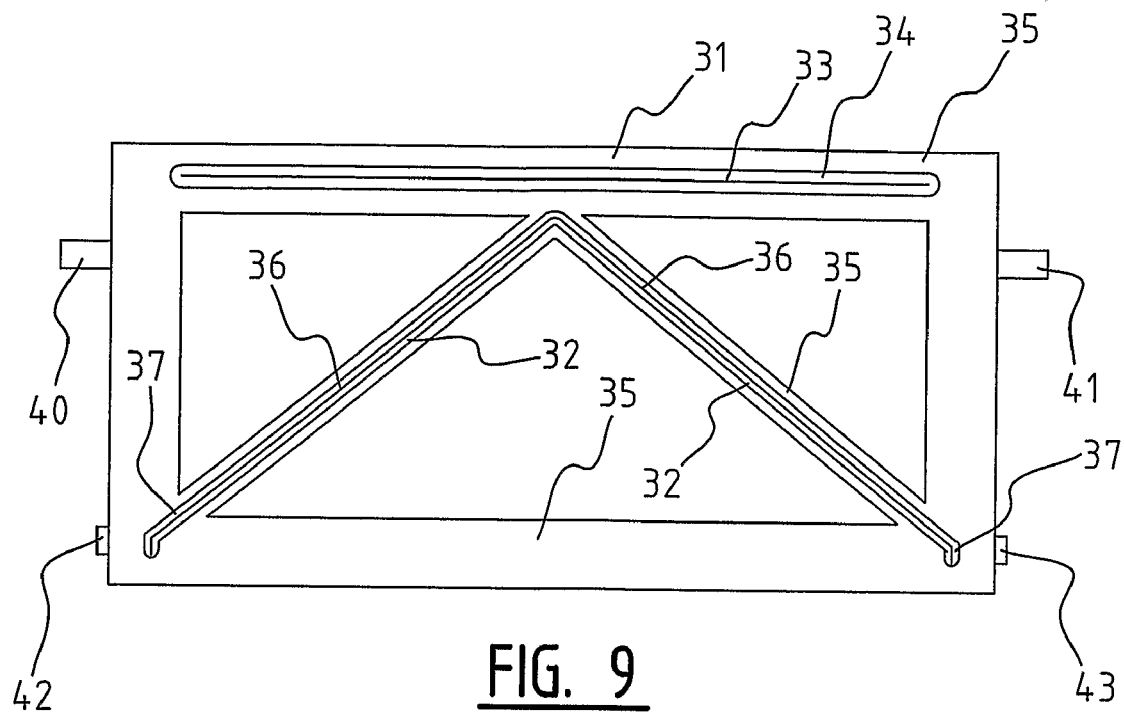
FIG. 9 shows a view of a first embodiment of a front-end module according to the present invention.

FIG. 9 shows a further preferred embodiment of the invention. The embodiment relates to a front-end module 30 of a vehicle. Such a front-end module 30 is constructed from a lying impact-absorbing element 31 and a support element 32 supporting the element 31. Impact-absorbing element 31 is constructed from reinforcing structure 34 comprising a number of cords 33, as according to any of the embodiments of such a structure described herein. A plastic body 35 is arranged round reinforcing structure 34. Support element 32 likewise consists of a reinforcing structure 37 which comprises a number of reinforcing cords arranged substantially in a V-shape and around which the above stated plastic body 35 is arranged. Reinforcing structure 34 and reinforcing structure 37 of support element 32 are not coupled to each other or comprise provisions with which they can be coupled to each other. On either side of lying part 31 are provided upper mounting means 40 and 41 and lower mounting means 42 and 43 for the purpose of mounting front-end module 30 on respectively the upper and lower mounting provisions (not shown) of the vehicle.

Further components of the vehicle such as bumpers, a radiator, headlights and the like can be mounted on front-end module 30 in known manner. The lying impact-absorbing element 31 has the primary function of absorbing the impact in the case of a collision with an object, while support element 32 has the primary function of supporting or "shoring" the above stated lying element 31.

In the shown embodiment of the front-end module a reinforcing construction according to one of the preferred embodiments stated herein is applied so that the whole can have a relatively low weight while rigidity remains constant. The lying element 31 is more particularly provided with a reinforcing structure according to one of the embodiments shown in FIGS. 2-4, preferably the embodiments shown in FIG. 3B, 3C, 4B or 4C. Support element 32 can have a reinforcing structure of the same embodiment, but embodiments as shown in FIGS. 1A-1C are also possible. It is even possible to partially omit the plastic body which is normally present around the reinforcing structure. This has the advantage of a further reduction in the weight and price of the construction.

Figure 10:
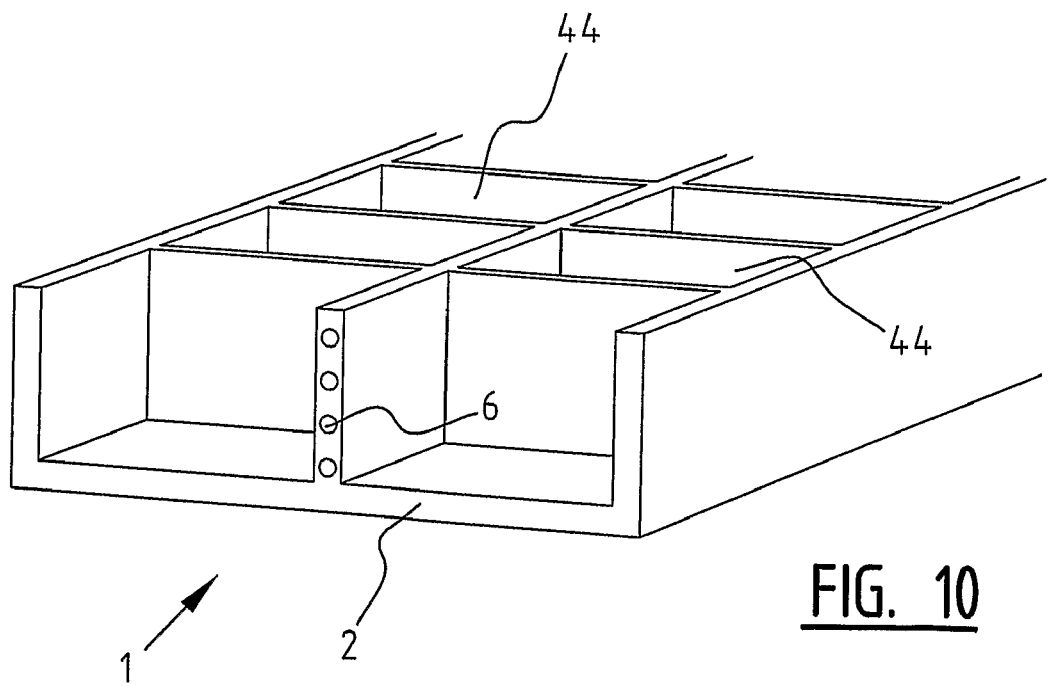
FIG. 10 shows a perspective view of an impact-absorbing element in which the body is provided with a number of block-like recesses.

In another embodiment, as shown in FIG. 10, a body is still formed around the reinforcing structure to prevent torsion in module 30. In the embodiment shown in FIG. 10 several recesses 44 are however arranged in the body in order to make the whole lighter in weight. In the case that such support elements are manufactured using an injection moulding process, these recesses 44 can be arranged in simple manner by placing a number of blocks in the injection mould on either side of the reinforcing structure 3 placed therein. When the mould is then injected with plastic, no plastic material will come to lie at the position of the blocks, which results in said recesses 44.

Figure 11:
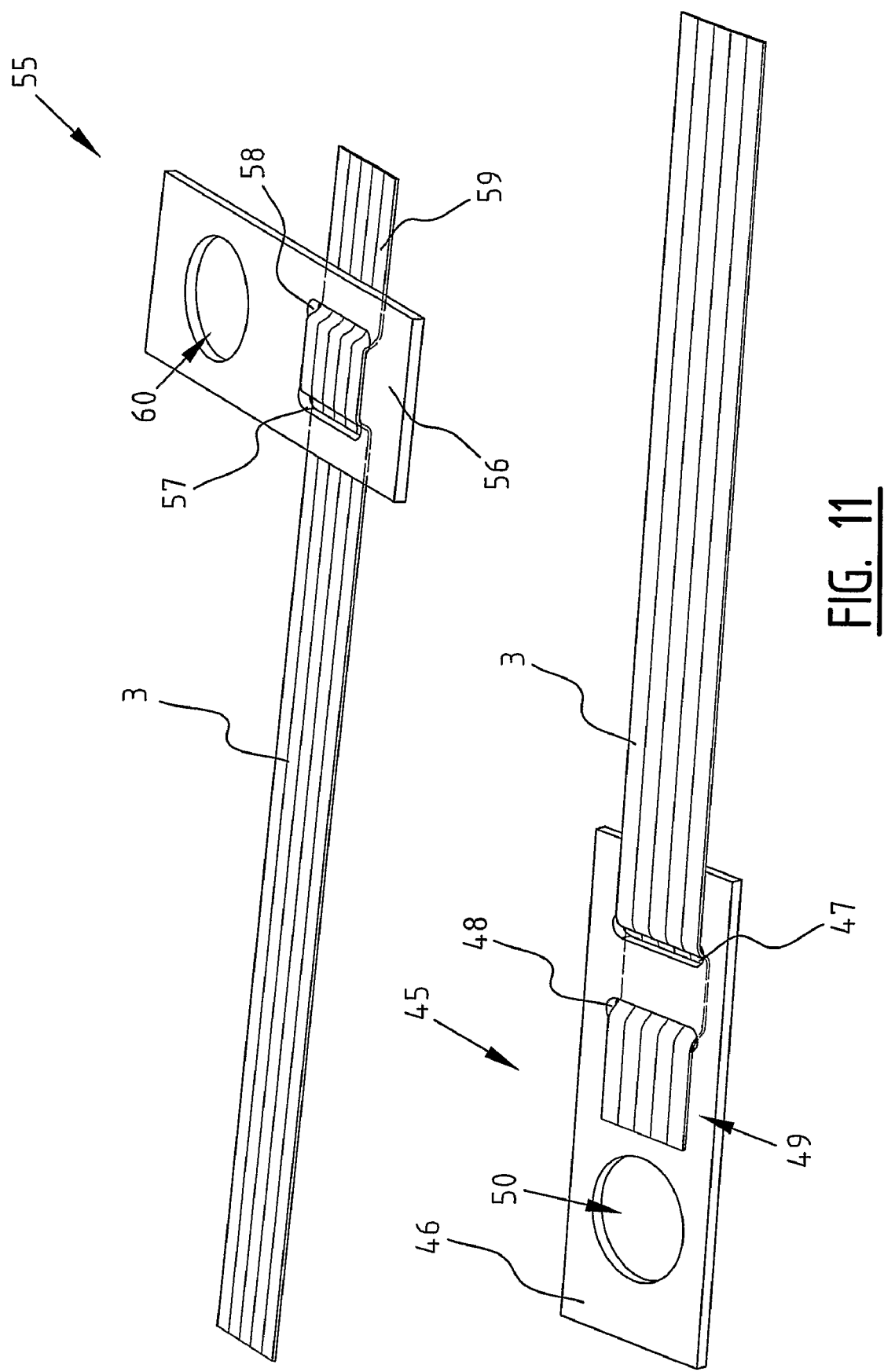
FIG. 11 shows a perspective view of a reinforcing structure provided with different embodiments of an anchoring element according to the invention.
Figure 12A:
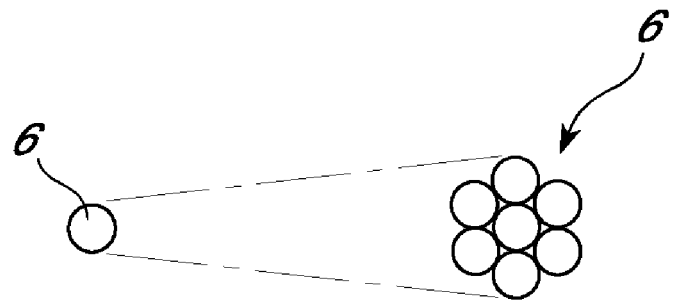
FIG. 12 shows a perspective view of an embodiment of reinforcing cords 6 constructed of diverse entwined metal strands.
Figure 12B:
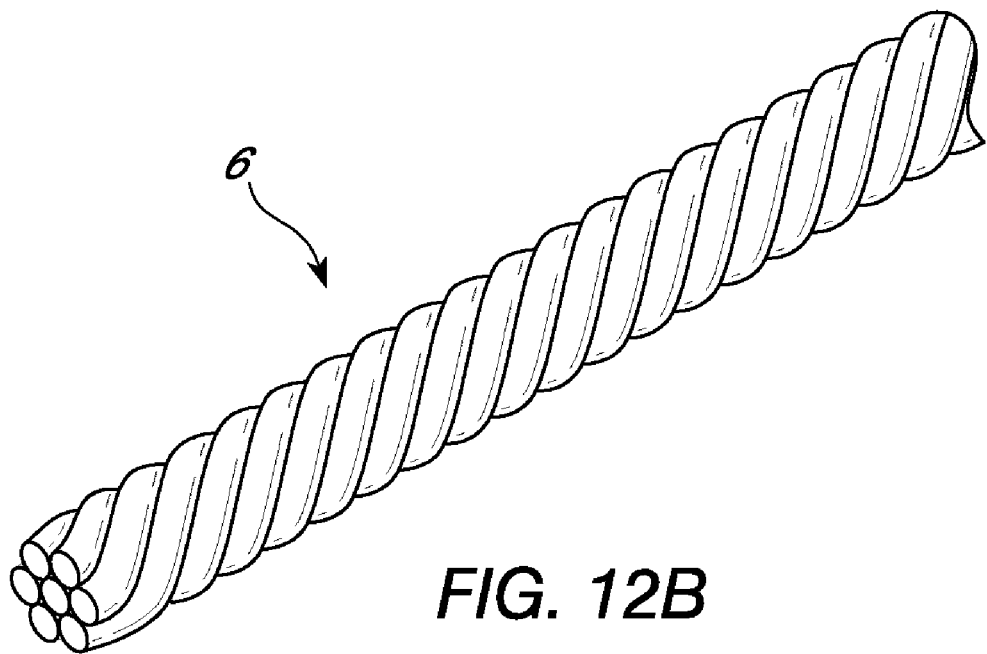

The lower part of FIG. 11 shows a reinforcing structure 3 according to a random preferred embodiment as described herein. An anchoring element, also referred to as anchoring buckle 45, is arranged at both ends 49 of reinforcing structure 3 (only one end is shown in the figure for the sake of simplicity). Anchoring buckle 45 is constructed from a rigid, plastic or metal plate 46 in which an opening 50 and two slots 47 and 48 are arranged. The reinforcing structure is clamped fixedly by guiding the end 49 thereof through said two slots 47 and 48. Opening 50 has a form and dimensions such that a fastening bolt can be guided therethrough, preferably the already provided fastening bolt with which the impact-absorbing element is mounted on the vehicle. By fastening anchoring buckle 45 and the reinforcing structure 3 clamped fixedly thereon to said bolt (not shown in the figure for the sake of simplicity), an improved anchoring of reinforcing structure 3 in the body of the impact-absorbing element and an improved anchoring of impact-absorbing element on the vehicle can be obtained.

The upper part of FIG. 11 shows a second preferred embodiment of the anchoring buckle. This anchoring buckle 55 extends transversely of the longitudinal direction of the reinforcing structure. The opening 60 and slots 56,57 otherwise correspond to the above defined opening and slots of the first embodiment. The operation of anchoring buckle 55 largely corresponds to that of anchoring buckle 45, albeit that, when an impact is exerted on the impact-absorbing element, anchoring buckle 55 will not be able to fully absorb the tensile force immediately but must first be rotated through a determined angle.

The present invention is not limited to the preferred embodiments thereof described herein. The rights sought are rather defined by the following claims, within the scope of which many modifications can be envisaged.

The invention claimed is:

1. An impact absorber for a vehicle comprising:
   a body comprising a thermoplastic polymer material;
   an elongate reinforcing structure provided in the body and comprising a number of metal reinforcing cords extending substantially parallel and a number of positioners arranged between the cords for holding the metal reinforcing cords substantially mutually parallel before and during the manufacturing process; and
   a plurality of anchors arranged on the elongate reinforcing structure for further anchoring of the reinforcing structure in the body, wherein the anchors are anchoring buckles;
   wherein at least one anchoring buckle is arranged to fixedly clamp the reinforcing structure therein, and provides anchoring for mounting the impact absorber on the vehicle; and
   wherein the anchoring buckles comprise rigid plates.

2. The absorber of claim 1, wherein the reinforcing structure also comprises a matrix provided round the reinforcing cords and positioners, which matrix comprises thermoplastic polymer material.

3. The absorber of claim 2, wherein the matrix also comprises one or more random fiber structures for the purpose of anchoring the metal cords.

4. The absorber of claim 3, wherein a random fiber structure is provided on at least one side of the surface defined by the metal cords and positioners.

5. The absorber of claim 3, wherein random fiber structures are provided on either side of the surface defined by the cords and positioners.

6. The absorber of claim 3, wherein said random fiber structure is constructed from mutually hooking glass fibers.

7. The absorber of 6, wherein the reinforcing cords are constructed from two or more metal strands and wherein the glass fibers of said random fiber structure have dimensions such that they are anchored between successive strands of the metal cords.

8. The absorber of claim 6, wherein the random fiber structure is between 1 cm and 10 cm in length.

9. The absorber of claim 3, wherein the random fiber structure has a thickness of a maximum of about 2 mm.

10. The absorber of claim 2, wherein the matrix also comprises at least one glass fabric which is provided on at least a side of the surface defined by the metal cords and positioners.

11. The absorber of claim 2, wherein glass fabrics are provided on either side of the surface defined by the cords and positioners.

12. The absorber of claim 10, wherein the glass fabric comprises a fabric of glass fibers and co-mingled plastic yarns.

13. The absorber of claim 10, wherein the one or more random fiber structures are arranged between the metal reinforcing cords on the one hand and a glass fabric on the other.

14. The absorber of claim 1, wherein a polymer layer is provided on either side of the reinforcing cords with positioners, at least one random fiber structure on each of the polymer layers, at least one further polymer layer on each of the random fiber structures, and at least one glass fabric on each of the further polymer layers and at least one sealing polymer layer on each of the glass fabrics.

15. The absorber of claim 1, wherein the reinforcing construction has a substantially symmetrical form in axial direction.

16. The absorber of claim 1, wherein the metal cords are manufactured from steel.

17. The absorber of claim 1, wherein the cords are constructed from diverse entwined metal filaments with a diameter of 0.5 mm or smaller, preferably 0.3 mm or smaller.

18. The absorber of claim 1, wherein mounts are provided on the absorber for mounting the absorber on the vehicle.

19. The absorber of claim 1, wherein the positioners are formed by plastic weft threads.

20. The absorber of claim 19, wherein the weft threads are manufactured from a material with a temperature resistance higher than the melting temperature of the polymer material.

21. The absorber of claim 1, wherein the thermoplastic polymer material of the body and/or the thermoplastic polymer material of the matrix is a polymer material chosen from the group of thermoplastics such as for instance polypropylene, polyethylene, polyethylene terephthalate, polybutylene terephthalate, polyamide, polycarbonate or mixtures thereof.

22. A front-end of a vehicle, comprising headlights; a radiator; and
one or more absorbers as defined in claim 1.

23. The front-end of claim 22, comprising said body provided with two or more reinforcing structures as well as lower and upper mounting means for mounting the body on lower and upper mounting provisions on the vehicle, wherein the front-end is adapted so that, in the mounted state, a first reinforcing structure extends between two upper mounting means and at least one reinforcing structure extends from the first reinforcing structure to at least one lower mounting means.

24. The front-end of claim 23, wherein the module is adapted so that, in the mounted state, a first reinforcing structure extends between two upper mounting means and at least one reinforcing structure extends obliquely from the middle of the first reinforcing structure to both lower mounting means.

25. A method for manufacturing an impact absorber for a vehicle according to claim 1, the method comprising:
arranging at least one of a matrix of polymer material, one or more random fiber structures and one or more glass fabrics around the reinforcing cords and positioners;
providing one or more layers comprising thermoplastic polymer material;
placing a pre-heated stack of the reinforcing structure with the one or more polymer layers into a compression mold;
compressing the whole of reinforcing structure and fluid polymer material for bringing thereof into the desired form;
cooling the reinforcing structure with the polymer material applied therearound which has been brought into the desired form.

26. The method of claim 25, further comprising heating the stack to a temperature well above the melting point of the polymer material, and compressing the stack with a pressure of about 200 bar.

27. A method for manufacturing an impact absorber for a vehicle according to claim 1, comprising:
arranging at least one of a matrix of polymer material, one or more random fiber structures and one or more glass fabrics around the reinforcing cords and positioners;
arranging one or more fixing openings between the metal reinforcing cords in the reinforcing structure;
placing the reinforcing structure provided with the fixing openings into an injection mold;
injection-molding thermoplastic polymer material in the injection mold so as to arrange a body of polymer material around the reinforcing structure, wherein the polymer material also enters the fixing openings in order to fix the reinforcing structure in the body.

28. The method of claim 27, wherein protrusions are provided in the injection mold for providing corresponding recesses in the body of the absorber.

29. A method for manufacturing a front-end of a vehicle that comprises the impact absorber of claim 1, the method comprising the steps of:
manufacturing the elongate reinforcing structure as a first reinforcing structure;
manufacturing one or more elongate second reinforcing structures;
positioning the second reinforcing structures relative to the first reinforcing structure;
forming the body of thermoplastic polymer material around the first and second reinforcing structures;
providing upper mounts for mounting the first reinforcing structure on upper mounting provisions in the vehicle;
providing lower mounts for mounting the one or more second reinforcing structures on lower mounting provisions in the vehicle; and
arranging the anchors on the elongate reinforcing structure.

30. The method of claim 29, wherein the second reinforcing structure has substantially a V-shape.

31. The method of claim 25, comprising:
providing an elongate reinforcing structure provided in the body and comprising a number of metal reinforcing cords extending substantially parallel and a number of positioners arranged between the cords for holding the metal reinforcing cords substantially mutually parallel before and during the manufacturing process, wherein anchors are arranged on the elongate reinforcing structure for further anchoring of the reinforcing structure in the body and wherein at least one of the anchors is embodied for fixedly clamping the reinforcing structure therein, and is provided with at least one opening in which a fastening bolt can be arranged with which the absorber can be mounted on the vehicle; and
arranging said fastening bolt in the respective openings in the anchors for mounting the impact absorber on the vehicle.

32. The method of claim 25, comprising providing an elongate reinforcing structure provided in the body and comprising a number of metal reinforcing cords extending substantially parallel and a number of positioners arranged between the cords for holding the metal reinforcing cords substantially mutually parallel before and during the manufacturing process.

33. The absorber of claim 1, wherein the vehicle is a car.

34. The absorber of claim 9, wherein the random fiber structure has a thickness of a maximum of about 1 mm.

35. The absorber of claim 12, wherein co-mingled plastic yarns are polypropylene yarns.

36. The absorber of claim 1, wherein the anchoring buckles comprise an opening and two slots.

* * * * *

UNITED STATES PATENT AND TRADEMARK OFFICE
CERTIFICATE OF CORRECTION

PATENT NO. : 8,220,850 B2  
APPLICATION NO. : 12/293969  
DATED : July 17, 2012  
INVENTOR(S) : Opperman et al.

Page 1 of 1

It is certified that error appears in the above-identified patent and that said Letters Patent is hereby corrected as shown below:

At column 10, line 33, in Claim 7, please delete "of 6" and insert --of claim 6--, therefor.

Signed and Sealed this  
Twenty-seventh Day of November, 2012

David J. Kappos  
*Director of the United States Patent and Trademark Office*